(12) United States Patent
Smolinske et al.

(10) Patent No.: US 9,925,702 B2
(45) Date of Patent: *Mar. 27, 2018

(54) LIGHTWEIGHT AIRCRAFT SEAL MATERIAL

(71) Applicant: 4M Company, Seattle, WA (US)

(72) Inventors: Stephen B Smolinske, Seattle, WA (US); Rodger Clement, Seattle, WA (US); Jim Sears, Seattle, WA (US); Vern Meyers, Seattle, WA (US)

(73) Assignee: 4M Company, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,093

(22) Filed: Jun. 9, 2016

(65) Prior Publication Data

US 2016/0288382 A1 Oct. 6, 2016

Related U.S. Application Data

(63) Continuation of application No. 13/365,102, filed on Feb. 2, 2012, now Pat. No. 9,371,129.

(60) Provisional application No. 61/439,048, filed on Feb. 3, 2011.

(51) Int. Cl.

| | | |
|---|---|---|
| *C08L 83/04* | (2006.01) | |
| *B29C 45/00* | (2006.01) | |
| *B64C 1/14* | (2006.01) | |
| *B29B 11/16* | (2006.01) | |
| *B29C 45/72* | (2006.01) | |
| *F16J 15/02* | (2006.01) | |
| *B29K 83/00* | (2006.01) | |
| *B29K 105/16* | (2006.01) | |
| *B29K 509/08* | (2006.01) | |
| *B29L 31/26* | (2006.01) | |

(52) U.S. Cl.
CPC .......... *B29C 45/0001* (2013.01); *B29B 11/16* (2013.01); *B29C 45/72* (2013.01); *B64C 1/14* (2013.01); *B64C 1/1492* (2013.01); *F16J 15/025* (2013.01); *B29K 2083/00* (2013.01); *B29K 2105/16* (2013.01); *B29K 2509/08* (2013.01); *B29K 2995/0046* (2013.01); *B29L 2031/26* (2013.01)

(58) Field of Classification Search
CPC .................................. C08L 83/04; B64C 1/14
See application file for complete search history.

(56) References Cited

U.S. PATENT DOCUMENTS

| | | |
|---|---|---|
| 3,575,427 A | 4/1971 | Lapac et al. |
| 3,986,213 A | 10/1976 | Lynch |
| 4,060,032 A | 11/1977 | Evans |
| 4,060,435 A | 11/1977 | Schroeder |
| 4,094,054 A | 6/1978 | Fischer |
| 4,144,372 A | 3/1979 | Beck |
| 4,485,192 A | 11/1984 | Gibbs et al. |
| 4,580,794 A | 4/1986 | Gibbons |
| 4,744,601 A | 5/1988 | Nakanish |
| 4,900,629 A | 2/1990 | Pitolaj |
| 5,162,397 A * | 11/1992 | Descamps .............. C08J 9/0066 521/154 |
| 5,202,362 A | 4/1993 | Hermele |
| 5,251,414 A | 10/1993 | Duke |
| 5,359,735 A | 11/1994 | Stockwell |
| 5,400,296 A | 3/1995 | Cushman et al. |
| 5,429,046 A | 7/1995 | Shiba et al. |
| 5,549,908 A | 8/1996 | Smith |
| 5,702,111 A | 12/1997 | Smith |
| 5,738,812 A | 4/1998 | Wild |
| 5,762,438 A | 6/1998 | Reed |
| 5,816,236 A * | 10/1998 | Moroi ..................... F24J 3/003 122/26 |
| 5,910,524 A | 6/1999 | Kalinoski |
| 5,945,036 A | 8/1999 | Reitz |
| 5,981,610 A * | 11/1999 | Meguriya .................. C08J 9/32 521/154 |
| 6,056,527 A | 5/2000 | Bunyan et al. |
| 6,127,457 A | 10/2000 | Darling |
| 6,194,476 B1 | 2/2001 | De Ridder et al. |
| 6,284,809 B1 | 9/2001 | Plummer et al. |
| 6,303,180 B1 | 10/2001 | Bunyan et al. |
| 6,328,765 B1 | 12/2001 | Hardwick et al. |
| 6,409,764 B1 | 6/2002 | White et al. |
| 6,443,986 B1 | 9/2002 | Malice, Jr. et al. |
| 6,451,374 B1 | 9/2002 | Ivatchko et al. |
| 6,540,427 B2 | 4/2003 | Scheidling et al. |
| 6,602,102 B2 | 8/2003 | Gines et al. |
| 6,623,864 B1 | 9/2003 | Sweet et al. |
| 6,635,354 B2 | 10/2003 | Bunyan et al. |
| 6,736,352 B2 | 5/2004 | Bladt |
| 7,101,607 B2 | 9/2006 | Mollendorf et al. |
| 7,552,896 B2 | 6/2009 | Coak |
| 9,371,129 B1 | 6/2016 | Smolinske et al. |
| 2004/0132890 A1 | 7/2004 | Oka et al. |
| 2007/0069080 A1 | 3/2007 | Rassaian |
| 2007/0267131 A1 | 11/2007 | Reitmeter et al. |
| 2008/0318011 A1 | 12/2008 | Chaussade et al. |
| 2010/0163676 A1 | 7/2010 | Burgunder et al. |
| 2012/0133079 A1 | 5/2012 | Sykes et al. |

OTHER PUBLICATIONS

Dave Demerjian, Airlines Try to Lighten Up—Literally www.wired.com/autopia/2008/04/airlines-try-to/.

(Continued)

*Primary Examiner* — Kuo-Liang Peng
(74) *Attorney, Agent, or Firm* — Schacht Law Office, Inc.; Dwayne Rogge

(57) ABSTRACT

Disclosed herein is a novel approach to producing a seal. The seal is produced of a much lighter material than has been used before, produced by a process of mixing a compound containing uncured silicone and a volume of microspheres, and then dispensing this material into a mold. Such a mold will normally be a female mold having the negative three dimensional shape of the seal to be produced. The seal may then be pressurized and/or heated during the curing process either prior to removing the seal from the mold or after removing the seal from the mold.

5 Claims, 1 Drawing Sheet

(56) References Cited

OTHER PUBLICATIONS

Dr. Pietro Cervellera, Altair HyperWorks in Action, Webinar Series, Reducing Weight in Aircraft Structures, Nov. 27, 2007, 2:00-2:40pm ET.
Federal Aviation Administration, Aircraft Weight and Balance Handbook, FAA-H-8083-1A.
Freeman (Silicones, Published for the Plastics Institute, ILIFFE Books Ltd., 1962, p. 27).
OverMolding (http://www.acomold.com/what-is-overmolding.html) (date unknown).
SiliconeOil (http://www.dowcoming.com/content/discover/discoverchem/si-rheology.aspx- ) (date unknown).

\* cited by examiner

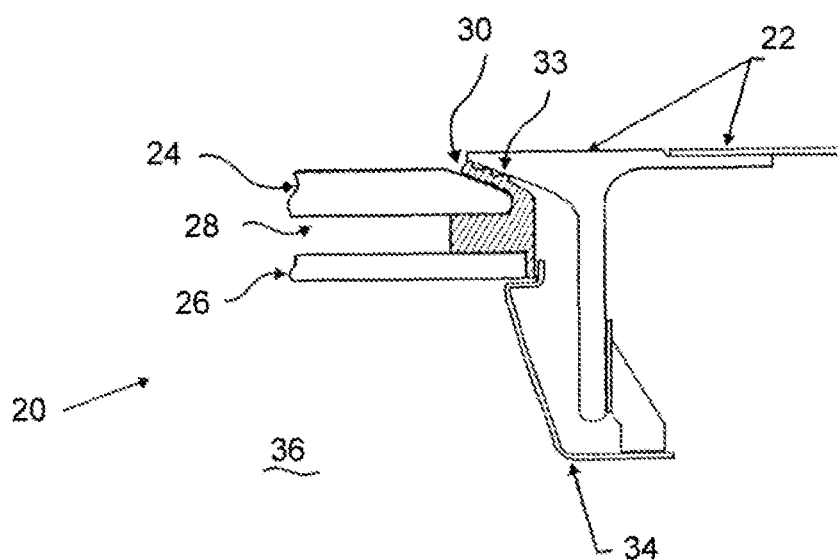

008-0000-0000-0000-000000000000

LIGHTWEIGHT AIRCRAFT SEAL MATERIAL

RELATED APPLICATIONS

This application is a continuation of U.S. Ser. No. 13/365,102 filed on Feb. 2, 2012 which claims priority benefit of U.S. Ser. No. 61/439,048, filed Feb. 3, 2011, incorporated herein by reference.

BACKGROUND OF THE DISCLOSURE a) Field of the Disclosure

This application relates to the field of lightweight cabin, cockpit, and storage window and door seals for commercial, personal, military, and other aircraft.

b) Background Art

Malleable seals for aircraft have been in use since aircraft first used windows. Such seals are similar in some respects to the malleable seals found in homes, automobiles, boats, and elsewhere. Generally, such seals form a weather-tight malleable separation between the outer hull (frame and skin) of the aircraft and the window(s). Such seals are utilized so that the interior of the cabin stays warm, dry, and in modern aircraft, pressurized. Such seals must remain useable in the presence of very high pressures differentials between the interior and exterior of aircraft that fly at high altitudes. Such pressures are utilized to supply sufficient oxygen (and heat) to passengers and crew.

FIG. 1 shows a highly schematic view of a modern aircraft window assembly 20 in cross section. The aircraft skin and frame are shown at 22 with an outer transparent window pane 24 and inner transparent window pane 26 separated by an airspace 28. The use of double panes is a common structure which improves thermal and acoustic insulation of the assembly, and in some applications allows for air to be evacuated from the airspace 28 to reduce condensation, improve thermal and acoustic insulation, and improve visual transmission through the window assembly.

Especially as fuel costs rise, aircraft manufacturers and airlines are looking to reduce the weight of the aircraft and load in any way possible. Airlines have in some applications removed magazine racks, redesigned food and beverage carts, used lighter frame materials such as carbon fiber over the much heavier traditional aluminum, reduced the allowed baggage each passenger is allowed to bring without additional cost to them, etc.

As the limits of weight reduction infringe on safety issues, reducing the weight of the aircraft and load becomes exponentially more difficult.

SUMMARY OF THE DISCLOSURE

Disclosed herein is a lightweight seal made by the steps comprising: providing a volume of viscoelastic fluid silicone; providing a volume of microspheres; combining the fluid silicone with the microspheres to produce a lightweight fluid. The lightweight fluid is then disposed into a female mold having the negative three dimensional shape of the seal. The lightweight fluid is then allowed to cure; and is removed from the mold.

To promote a better seal in one embodiment, the process for forming the seal as recited above may further comprise the step of applying heat to the lightweight fluid during the curing process. This step of applying heat to the lightweight fluid may be enacted during the curing process prior to removing the seal from the mold.

While the window seal as recited above may utilize several different microspheres, in one embodiment the microspheres are air filled glass spheres. These air filled glass spheres in one embodiment may be formed of silica quartz, although other materials may also be utilized.

BRIEF DESCRIPTION OF THE DRAWINGS

FIG. 1 is a highly schematic view of a seal in cross section, produced by one embodiment of the disclosure.

DESCRIPTION OF THE PREFERRED EMBODIMENTS

Reduction of the overall weight of an aircraft or other apparatus and load (including passengers, crew, baggage, freight, etc.) has been a priority for aircraft designers, manufacturers, and airlines for some time. The limits of such weight reduction however have an upper limit. As obviously superfluous items are removed, removal of the remaining items may not be practical. As the lightest known materials and composites are then used for the remaining items such as windows, frames, seats, etc. additional weight reduction becomes much more difficult.

In this endeavor to lighten the aircraft or other apparatus without sacrificing structural integrity, the malleable seals used to seal the windows and doors to the frame and/or skin of the aircraft were examined to determine if there is a potential to reduce the weight thereof without sacrificing structural integrity of the seal or surrounding structure. While this may not seem to have a significant impact on the weight of the aircraft, it should be noted that modern aircraft may have 200 passenger windows or more. Many aircraft manufacturers and their customers are looking at ways to make the traditional aircraft windows larger to increase outside visibility and reduce the amount of power required for interior lighting. In addition, the door seals, hatch seals, windshield seals, and other components may also be converted from the rubber, silicone, or other relatively heavy materials to the disclosed material, further decreasing the overall weight of the aircraft.

While the term "window seals" is used herein for brevity, the disclosed material may also be used in malleable door seals, hatch seals, and other equivalent components which are positioned between separate rigid structures.

Disclosed herein is a novel approach to producing an aircraft window seal produced of a much lighter material than has been used before. The aircraft window seal is produced by mixing a compound containing uncured silicone and a volume of microspheres, and then dispensing this material into a mold. Such a mold will normally be a female mold having the negative three dimensional shape of the aircraft seal to be produced. The seal may then be pressurized and/or heated during the curing process either prior to removing the seal from the mold, or after removing the seal from the mold.

This approach is effective as the microspheres are less dense than the silicone or rubber traditionally used. Microspheres themselves are not effective as seals for many reasons including their lack of malleability, airflow around adjacent microspheres, and potentially airflow through individual microspheres. In addition, while a significant percentage of the material needs to be made of microspheres in order to establish a weight loss of the final composition, a delicate balance must be achieved in each application between the volume of silicone, and the volume of microspheres. Using to high a percentage volume of microspheres would result in a poor material due to lack of malleability, and possibly airflow through the material. As the windows tend to deflect outward as the aircraft is pressurized from within, especially at cruising altitudes, such malleability is especially important to maintain integrity of the seal. It is also suspected that a high percentage of microspheres may adversely effect the migration of the seal relative to the window and/or aircraft frame/skin.

The term microspheres is a term well known in the art as nearly microscopic spheres typically (typically 1 μm to 1000 μm (1 mm)), commonly made of glass (quartz) or other ceramics. The spheres are commonly hollow and air-filled, but may be filled with other gasses and may not be sealed (open cell) hollow spheres. Microspheres are also commonly polyethylene and polystyrene.

Such a seal for aircraft as recited above is particularly well suited for any commercial or military aircraft where weight savings are desirable in order to increase fuel efficiency.

The disclosed lightweight viscoelastic fluid has been produced and tested by combining a volume of fluid silicone with a volume of micro spheres. The test results of a gasket made from this material are shown below:

|  | Test method |  | Results |
| --- | --- | --- | --- |
| Durometer | Points | ATSM D 2240 | 55 |
| Tensile Strength | PSI, Min | ATSM D 412 | 682 |
| Elongation | % Min | ATSM D 412 | 520 |
| Tear Resistance | PPI, Min | ATSM D 624 | 80 |
| Specific Gravity | Points | ATSM D 297 | 1.00 |

The seal comprises a seal gasket made from a formulated compound containing viscoelastic fluid silicone and micro spheres.

Viscoelasticity is the property of materials that exhibit both viscous and elastic characteristics when undergoing deformation. Viscous materials, like honey, resist shear flow and strain linearly with time when a stress is applied.

The uncured compound may be injected, poured, or placed by hand in the mold. The mold is then closed and compound is allowed to cure for a time whereupon the mold is opened and the finished part (seal) is removed. In some applications, the uncured compound may be subjected to heat and or pressure to effect physical and/or chemical changes in the material. For example, the uncured compound may be injected into the mold, whereupon the mold and material are subjected to increased pressures and increased temperatures during at least part of the curing process.

It may also be desired to increase production output, to remove the partially cured seal from the mold. The partially cured seal may be subjected to heat, pressure, or may just be allowed to cure over time outside of the mold. As long as the uncured seal holds the desired shape until completely cured, it may not be detrimental to remove it from the mold prior to final curing.

The seal may then be installed into an aircraft to hold windows in place and seal the gap between the window and the aircraft frame or skin.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A method for making a lightweight seal comprising the steps of:
   a. providing a volume of viscoelastic silicone which exhibits both viscous and elastic characteristics when molded;
   b. providing a volume of microspheres;
   c. combining the viscoelastic silicone with the microspheres to produce a lightweight viscoelastic compound;
   d. disposing the lightweight viscoelastic compound into a female mold having the negative three dimensional shape of the seal;
   e. following the step of disposing the lightweight viscoelastic compound into a female mold, subjecting the viscoelastic compound to increased pressure and heat over time to cure, thus forming the seal;
   f. removing the seal from the mold
   g. applying the cured seal to a first component; and
   h. applying the seal—first component combination to a second component to seal a gap between the first component and the second component.

2. The method for making a seal as recited in claim 1 wherein the microspheres are air filled glass spheres.

3. The method for making a seal as recited in claim 2 wherein the air filled glass spheres are formed of silica quartz.

4. The method for making a seal as recited in claim 1 wherein the step of disposing the lightweight viscoelastic compound into a female mold is accomplished by pressure injection molding.

5. The method for making a seal as recited in claim 1 wherein the seal is selected from the list consisting of: window seals, door seals, hatch seals, and windshield seals.

* * * * *